US012235352B2

(12) United States Patent
Calabrese

(10) Patent No.: US 12,235,352 B2
(45) Date of Patent: Feb. 25, 2025

(54) METHOD FOR PERFORMING SAR ACQUISITIONS WITH ENHANCED AZIMUTH RESOLUTION

(71) Applicant: Thales Alenia Space Italia S.p.A. Con Unico Socio, Rome (IT)

(72) Inventor: Diego Calabrese, Rome (IT)

(73) Assignee: Thales Alena Space Italia S.p.A. Con Unico Socio, Rome (IT)

(*) Notice: Subject to any disclaimer, the term of this patent is extended or adjusted under 35 U.S.C. 154(b) by 137 days.

(21) Appl. No.: 17/602,554

(22) PCT Filed: Apr. 9, 2020

(86) PCT No.: PCT/IB2020/053408
§ 371 (c)(1),
(2) Date: Oct. 8, 2021

(87) PCT Pub. No.: WO2020/208578
PCT Pub. Date: Oct. 15, 2020

(65) Prior Publication Data
US 2022/0187445 A1   Jun. 16, 2022

(30) Foreign Application Priority Data

Apr. 9, 2019  (IT) .................. 102019000005438

(51) Int. Cl.
*G01S 13/90*     (2006.01)
(52) U.S. Cl.
CPC ....... *G01S 13/9017* (2013.01); *G01S 13/9052* (2019.05); *G01S 13/9054* (2019.05)

(58) Field of Classification Search
CPC ............ G01S 13/9017; G01S 13/9052; G01S 13/9054; G01S 13/904; G01S 13/90; G06T 2207/10044
See application file for complete search history.

(56) References Cited

FOREIGN PATENT DOCUMENTS

DE       102016208899 B3     6/2017

OTHER PUBLICATIONS

Gebert, Nicolas (2009) Multi-Channel Azimuth Processing for High-Resolution Wide-Swath SAR Imaging. DLR-Forschungsbericht. DLR-FB 2009-13. DLR (German Aerospace Center). 215 S. (Year: 2009).*

(Continued)

*Primary Examiner* — Bernarr E Gregory
*Assistant Examiner* — Juliana Cross
(74) *Attorney, Agent, or Firm* — McCarter & English, LLP

(57) ABSTRACT

The present invention concerns a method for performing SAR acquisitions, which comprises performing, in a time division fashion, SAR acquisitions of areas of a swath of earth's surface by means of a SAR system carried by an air or space platform; wherein performing SAR acquisitions in a time division fashion includes contemporaneously acquiring, in each pulse repetition interval, a plurality of areas of the swath that are separated in azimuth; and wherein the areas acquired in T successive pulse repetition intervals form an azimuth-continuous portion of said swath, T being an integer greater than one.

10 Claims, 10 Drawing Sheets

(56) References Cited

OTHER PUBLICATIONS

D. Calabrese, V. Mastroddi and S. Federici, "DI2S Multiswath Innovative Technique for SAR Acquisitions Optimization," in IEEE Geoscience and Remote Sensing Letters, vol. 14, No. 10, pp. 1820-1824, Oct. 2017, doi: 10.1109/LGRS.2017.2737318) (Year: 2017).*

G. Krieger, N. Gebert and A. Moreira, "Multidimensional Waveform Encoding: A New Digital Beamforming Technique for Synthetic Aperture Radar Remote Sensing," in IEEE Transactions on Geoscience and Remote Sensing, vol. 46, No. 1, pp. 31-46, Jan. 2008, doi: 10.1109/TGRS.2007.905974. (Year: 2008).*

Nicolas Gebert, et al: "Digital Beamforming on Receive: Techniques and Optimization Strategies for High-Resolution Wide-Swath SAR Imaging", IEEE Transactions ON Aerospace And Electronic Systems, IEEE Service Center, Piscataway, NJ, US, vol. 45, No. 2, Apr. 1, 2009 (Apr. 1, 2009), pp. 564-592, XP011262853, ISSN: 0018-9251.

Nicolas Gebert: "Multi-Channel Azimuth Processing for High-Resolution Wide-Swath SAR Imaging" In: "Multi-Channel Azimuth Processing for High-Resolution Wide-Swath SAR Imaging", Aug. 1, 2009 (Aug. 1, 2009), Deutsches Zentrum fur Luft-und Raumfahrt Institut für Hochfrequentechnik und Radarsysteme, Oberpfaffenhofen, XP055249952, ISSN: 1434-8454, vol. 2009-13, p. 33-42.

Federica Bordoni, et al.: "Ambiguity Suppression by Azimuth Phase Coding in Multichannel SAR Systems", IEEE Transactions on Geoscience And Remote Sensing, IEEE Service Center, Piscataway, NJ, US, vol. 50, No. 2, Feb. 1, 2012 (Feb. 1, 2012), pp. 617-629, XP011397759, ISSN: 0196-2892.

PCT International Search Report & Written Opinion dated Jun. 29, 2020 for PCT Application No. PCT/IB2020/053408.

PCT Second Written Opinion dated Apr. 7, 2021 for PCT Application No. PCT/IB2020/053408.

PCT/IB2020/053408, Sep. 4, 2020, WO 2020/208578.

* cited by examiner

METHOD FOR PERFORMING SAR ACQUISITIONS WITH ENHANCED AZIMUTH RESOLUTION

CROSS-REFERENCE TO RELATED APPLICATIONS

This patent application is a 35 U.S.C. § 371 National Stage filing of International Application No. PCT/IB2020/053408, filed on Apr. 9, 2020, which application claims priority from Italian patent application no. 102019000005438 filed on Apr. 9, 2019, the entire disclosure of which is incorporated herein by reference.

TECHNICAL FIELD OF THE INVENTION

The present invention relates, in general, to remote sensing based on Synthetic Aperture Radar (SAR) and, more specifically, to an innovative method for performing SAR acquisitions that allows meeting conflicting, requirements between azimuth resolution and swath size, while limiting hardware complexity in SAR systems.

STATE OF THE ART

As is known, one of the most important applications of spaceborne and airborne SAR-based Earth Observation (EO) systems is the capability to acquire large areas of the earth's surface with high resolution.

The main SAR acquisition geometry is the so-called Stripmap mode, wherein a SAR sensor carried along a flight direction by an air or space platform (e.g., an aircraft/drone or a satellite/spacecraft) transmits radar signals towards a strip of the earth's surface (known as swath) and then receives the corresponding back-scattered signals therefrom. Typically, the swath mainly extends parallel to an azimuth direction, which is identified by a ground track of the flight direction, and which is parallel to said flight direction. Moreover, the swath has a given width along an across-track direction, which lies on the earth's surface and is orthogonal to both the azimuth direction and a nadir direction that passes through the phase center of the antenna of the SAR sensor and that is orthogonal to the earth's surface and to the flight direction (and, hence, also to the azimuth direction). As is known, nominal azimuth resolution of the Stripmap mode is limited to half the physical or equivalent length along the azimuth direction of the SAR sensor's antenna.

Often, in order to improve azimuth resolution, the so-called Spotlight mode is used, which is the main SAR technique to obtain high spatial resolution. In particular, the Spotlight mode involves a continuous, or quasi-continuous, steering of SAR sensor's antenna beam in azimuth during flight so as to illuminate one and the same area of interest of the earth's surface with the transmitted radar signals and then receive the corresponding back-scattered signals therefrom. In this way, persistence time of the SAR sensor on the area of interest is increased and, hence, the azimuth resolution is improved. Unfortunately, the Spotlight mode does not allow to acquire strips, thereby having a strong limitation in acquired area's length along the azimuth direction.

More in general, SAR technology can be considered a mature technology; in fact, nowadays there are countless articles, manuals, patents and patent applications that describe the characteristics and potential thereof; in this regard, reference can be made, for example, to:

- the article by A. Currie and M. A. Brown entitled "Wide-swath SAP", IEE Proceedings F—Radar and Signal Processing, vol. 139, no. 2, pp. 122-135, April 1992, which hereinafter will be indicated, for simplicity of description, as Ref1 and which describes various methods for widening the swath observable via a SAR;
- the article by G. Krieger et al. entitled "*Advanced Concepts for High-Resolution Wide-Swath SAR Imaging*", 8$^{th}$ European Conference on Synthetic Aperture Radar, pp. 524-527, 7 Jun. 2010, which hereinafter will be indicated, for simplicity of description, as Ref2 and which presents various concepts regarding multi-channel SAR systems for creating high-resolution wide-swath SAR images;
- the book by J. C. Curlander and R. N. McDonough entitled "*Synthetic Aperture Radar: Systems and Signal Processing*", Wiley Series in Remote Sensing, Wiley-Interscience, 1991, which hereinafter will be indicated, for simplicity of description, as Ref3 and which is a manual on SAR systems;
- the book by G. Franceschetti and R. Lanari entitled "*Synthetic Aperture RADAR Processing*", CRC Press, March 1999, which hereinafter will be indicated, for simplicity of description, as Ref4 and which is another manual on SAR systems;
- the article by D. Calabrese entitled "*DIscrete Stepped Strip (DI2S)*", EUSAR 2014—10$^{th}$ European Conference on Synthetic Aperture Radar, 3-5 Jun. 2014, Berlin, Germany, which hereinafter will be indicated, for simplicity of description, as Ref5; or, equivalently, EP 2 954 347 B1 and EP 2 956 795 B1, which hereinafter will be indicated, for simplicity of description, as Ref6 and Ref7, respectively;
- the book by N. Gebert entitled "*Multi-Channel Azimuth Processing for High-Resolution Wide-Swath SAR Imaging*", 1 Aug. 2009, Deutsches Zentrum für Luftund Raumfahrt e. V., Oberpfaffenhofen, which hereinafter will be indicated, for simplicity of description, as Ref8 and which is another manual on SAR systems which presents various concepts regarding multi-channel SAR systems for creating high-resolution wide-swath SAR images;
- DE 10 2016 208899 B3, which hereinafter will be indicated, for simplicity of description, as Ref9 and which relates to a SAR method for remote sensing of the earth's surface via a multi-aperture (multi-channel) radar system;
- the article by F. Bordoni et al. entitled "*Ambiguity Suppression by Azimuth Phase Coding in Multichannel SAR Systems*", IEEE Transactions on Geoscience and Remote Sensing, vol. 50, no. 2, 1 Feb. 2012, pp. 617-629, which hereinafter will be indicated, for simplicity of description, as Ref10; and
- the article by N. Gebert et al. entitled "*Digital Beamforming on Receive: Techniques and Optimization Strategies for High-Resolution Wide-Swath SAR Imaging*", IEEE Transactions on Aerospace and Electronic System, vol. 45, no. 2, 1 Apr. 2009, pp. 564-592, which hereinafter will be indicated, for simplicity of description, as Ref11.

As is broadly known in the SAR sector, the azimuth resolution for a SAR acquisition in Stripmap mode is a function of the angular aperture (or angular difference—delta angle) with which a target is observed by the SAR sensor; or, equivalently, the azimuth resolution can be also seen as a function of the time difference (delta time—related to the velocity of the SAR sensor) with which the target is observed. In particular, the azimuth resolution can be expressed by the following equation (for further details, reference can be made to Ref3 and Ref4):

$$res = \frac{0.886\lambda}{2*\text{delta\_angle}}$$

where res denotes the azimuth resolution, λ denotes the wavelength used by the SAR sensor and delta_angle denotes the angular aperture (or angular difference—delta angle) with which the target is observed by the SAR sensor.

Assuming the angular aperture delta_angle as a 3 dB aperture (one-way) of the antenna (=0.886λ/L, where L denotes the physical or equivalent length along the azimuth direction of the antenna of the SAR sensor), the constraint traditionally associated with the azimuth resolution for the Stripmap mode can be obtained, which is equal to L/2 (for further details, reference can be made again to Ref3 and Ref4).

As indicated in SAR literature, mathematical relations exist that link the parameters of the operational modes. In particular, azimuth sampling dictates that the transmission/reception Pulse Repetition Frequency (PRF) is linked to the size of the beam and to the velocity or the SAR sensor (for further details, reference can be made again to Ref3 and Ref4):

$$PRF \geq \frac{2*\alpha*v_{sat}}{L}$$

where α is a parameter dependent on the desired level of ambiguity, $v_{sat}$ denotes the velocity of the SAR sensor and L denotes the physical or equivalent length along the azimuth direction of the antenna of the SAR sensor.

The value of the PRF limits the extension of the measured area (swath) in range (for further details, reference can be made again to Ref3 and Ref4):

$$\Delta R \leq \left(\frac{1}{PRF} - 2\tau\right)\frac{c}{2}$$

where ΔR denotes the extension of the measured area (swath) in range, τ denotes the time interval (or duration) of the radar pulse transmitted and c denotes the speed of light.

In view of the foregoing, it is worth noting that wide, unambiguous swath coverage, high azimuth resolution and high sensibility pose conflicting requirements on SAR design. In particular, the requirements of having wide swaths and high azimuth resolutions are in mutual conflict. In fact, on the one hand, a low PRF is preferable to have "more time" to acquire a wide scene in across-track—elevation plane. However, on the other hand, a wide antenna beam is preferable to improve azimuth resolution. Unfortunately, this latter feature requires a high. PRF, thereby conflicting with the first requirement.

In order to improve SAR systems' capabilities and to propose new solutions for overcoming limits of the traditional Stripmap mode, several techniques have been proposed in recent years. Such techniques impose a performance degradation and/or a considerable complication in hardware development.

In particular, in addition to the Spotlight mode and burst modes (e.g., ScanSAR and TOPS) which provide a deterioration in azimuth resolution, in the SAR literature there are different techniques that try to overcome the above conflicting requirements. These techniques can be logically divided into:

space sharing (or space division) techniques;
angular/angle sharing (or angular/angle division) techniques; and
time sharing (or time division) techniques.

Space Sharing Techniques

In order to overcome the above problems, techniques have been proposed in the past that use space division modes, such as, for example, the so-called Displaced Phase Centers (DPC) technique (for further details, reference can be made to Ref1, Ref2 and Ref8), which requires the use of multiple reception antennas. This can be achieved by using multiple SAR sensors, or by segmenting a single antenna and using multiple reception systems.

In particular, according to the DPC technique, a wide beam is transmitted (i.e., small antenna size L) and then simultaneously received with M antennas (of small size like the one used in transmission) arranged along the azimuth direction. The use of multiple reception elements allows to have a larger number of azimuth samples and, hence, to use a lower PRF (for further details, reference can be made to Ref1, Ref2 and Ref8).

More in detail, the space sharing (or equivalently "spatial sampling") is well described on pages 33 and 39 of Ref8: "Multi-channel SAR system in azimuth have a single transmit aperture and a receiving antenna that is subdivided into N individual apertures in azimuth dimension (cf. FIG. 29, left). Each of the receive apertures and transmit antenna illuminate the same area on ground. Consequently, for each transmitted pulse such a sensor receives a number of N pulses at mutually displaced positions as illustrated in the right part of FIG. 29. This means that additional samples are gathered along the synthetic aperture and, as a result, the effective sampling rate of the azimuth signal is increased to N*PRF while the transmit PRF remains unaltered."

Additionally, a solution for implementing a space sharing approach is presented also in Ref9, which discloses a SAR method for remote sensing of the earth's surface via a multi-aperture radar system on a platform that moves in an azimuth direction, wherein a transmitting device is used for radar pulse transmission, and several receivers (each dedicated to a respective receiving channel) are used in reception, wherein the receivers are arranged in different positions on the platform along the azimuth direction.

Ref8 discloses also the possibility that, in order to acquire the different azimuth samples, the receivers can be installed on separated platforms: "The positions of the effective phase centers in azimuth of a single-platform system with exemplary 3 receivers—denoted from RX1 to RX3—are shown in the right part of FIG. 35. In this case the spacing of the samples is equal to half of the receive aperture spacing Δx, which corresponds also to the size of a single receive aperture. Note that all adjacent samples are spaced equally as all adjacent receive apertures show the same distance. In contrast, in a sparse array system the offset between adjacent receivers is no longer constant and consequently the resulting sample positions are distributed in azimuth with non-equal spacing, which is determined by the different distances Δxj of the respective receiver j to the transmitter (TX) (cf. FIG. 35, left). Considering now the system moving with constant velocity $v_s$ and the transmitter emitting a train of pulses with pulse repetition frequency PRF. Then the spatial distribution of samples ("spatial sampling") as shown in FIG. 36 is obtained."

Moreover, also Ref11 discloses processing features of the space sharing technique, explaining that this technique can be implemented by using either antenna partition or multiple systems: " . . . new system concepts are needed to fulfil the increasing demands of future SAR missions. The most promising concept employ multi-channel SAR system where receiving antenna is either split into multiple sub-apertures with independent receiver channels or the receiver apertures are distributed on multiple platforms leading to a multistatic SAR. References [6]-[37] list the various approaches in chronological order. All methods are based on the simultaneous reception of the backscattered signal with mutually displaced receiving apertures. . . . The paper summarized the state-of-the-art for SAR systems and principles that enable the HRWS imaging and recalled the basic proprieties of multi-aperture SAR signals regarding the spatial sampling".

In this respect, FIGS. 1A and 1B schematically illustrate an example of transmission and reception operations according to the DPC technique. In particular, FIG. 1A shows the transmission, by means of an antenna 11, of a wide beam in azimuth (i.e., a beam that is wide along the azimuth direction—namely, the flight direction), which results in a small equivalent dimension of the antenna 11 along the azimuth direction. Instead, FIG. 1B shows simultaneous reception performed by M receivers and M "small" antennas 12 (or a large one partitioned into M sub-blocks) arranged along the azimuth direction, wherein a beam similar to the transmitted one is used also for reception.

The biggest contraindication of the DPC technique is the complexity; in fact, this technique requires the simultaneous use of M receivers and M "small" antennas (or a large one partitioned into M sub-blocks) and, hence, requires high transmission power to achieve adequate product sensitivity. Furthermore, the SAR literature points out some criticalities at algorithm level regarding sensitivity to errors of knowledge of the M phase centers, as well as undesirable effects on the ambiguity level.

The space sharing technique probably represents the most commented/cited technique in literature. For example, also Ref10 describes a methodology for increasing range ambiguity for the space sharing technique: " . . . the current generation of spaceborne synthetic aperture radar (SAR) system suffers from a tradeoff between the achievable spatial resolution and swath width. This has motivated intensive research both on more flexible SAR systems, using multiple transmit/receive channels, and on technique for removing ambiguities. . . . Specifically, multichannel processing techniques are included to combine the signals received from the different azimuth channels".

In the SAR literature, there are some variants that try to reduce these criticalities, such as the so-called High Resolution Wide-Swath (HRWS) technique, which also involves partitioning in elevation in order to "follow" the beam in elevation, thereby increasing directivity and consequently product sensitivity.

Angular Sharing Techniques

The aim of the techniques that use angle division modes is similar to that of the techniques that use space division modes, but the additional samples are acquired by sampling in different directions. In particular, there are two main logics: angular division in elevation and angular division in azimuth.

Angular division in elevation (in this connection, reference can be made, for example, to the so-called Multiple Elevation Beam (MEB) technique described in Ref1) involves simultaneous acquisition with multiple antennas/reception systems and a single transmitter (with wide swath), or more directive transmissions (for further details, reference can be made to Ref1). In this way, a plurality of acquisitions is obtained in Stripmap mode with nominal azimuth resolution (approximately L/2). In order to reduce problems of range ambiguities, the SAR literature proposes squinting the individual beams in elevation.

In this respect, FIGS. 2A, 2B and 2C schematically illustrate an example of transmission and reception operations according to the MEB technique. In particular, FIG. 2A shows the transmission by an airborne/spaceborne SAR system 21 of a wide beam in elevation (i.e., a beam that is wide along the across-track direction, which is denoted by y). Instead, FIGS. 2B and 2C show reception by the airborne/spaceborne SAR system 21 that simultaneously uses narrower beams with different pointing in elevation so as to acquire a single wide swath 22 (i.e., a swath that is wide along the across-track direction y—FIG. 2B), or three narrower swaths 23, 24 and 25, which are spaced apart from each other along the across-track direction y (FIG. 2C).

Instead, angular division in azimuth (in this respect, reference can be made, for example, to the Single Phase Centre MultiBeam (SPCMB) technique described in Ref1) involves transmission by means of a single, wide-beam antenna and simultaneous reception by use of M narrower beams pointed in different directions in azimuth organized to acquire the overall illuminated area. In this way, a wide beam is obtained (thereby improving azimuth resolution), but similarly to the Spotlight mode, the single reception channels correctly sample a different angle portion. These channels will then be recombined during processing in order to obtain a synthesized delta angle M times greater, thus improving azimuth resolution (for further details, reference can be made to Ref3 and Ref4).

In this respect, FIGS. 3A and 3B schematically illustrate an example of transmission and reception operations according to the SPCMB technique. In particular, FIG. 3A shows the transmission by an airborne/spaceborne SAR system 31 of a wide beam in azimuth (i.e., a beam that is wide along the azimuth direction—namely, the flight direction). Instead, FIG. 3B shows reception by the airborne/spaceborne SAR system 31 that simultaneously uses narrower beams with different pointing in azimuth so as to acquire a wide swath (i.e., a swath that is wide along the azimuth direction).

In general, techniques based on angular division in azimuth have many criticalities with respect to the ambiguity level; in fact, lateral lobes of the antenna used in transmission and of the single antennas used in reception interact, raising the level of the ambiguities.

The space and angle division concepts are well summarized in Ref2, which in section 2 states: "Several proposals resolve the azimuth resolution vs. wide swath coverage dilemma by combining a multi-channel radar receiver with a small aperture transmitter illuminating a wide area on the ground. Examples are the squinted multiple beam SAR, . . . , the displaced phase center antenna (DPCA) technique . . . , the Quad Array SAR system . . . , and the High-Resolution Wide-Swath (HRWS) SAR system".

Also in this case, the biggest contraindication of the angular division techniques is the complexity; in fact, these techniques involve the simultaneous use of M receivers and M "small" antennas (or a large one partitioned into M sub-blocks) and, hence, require high transmission power to achieve adequate product sensitivity.

Time Sharing Techniques

The basic idea of time (or pulse) sharing techniques is to divide the acquisitions into a plurality of elementary strips acquired in time sharing by a single SAR using a single receiver and a single, non-partitioned antenna, and to combine them to obtain a product with improved azimuth resolution or to acquire multiple swaths. The basic idea is to perform acquisitions interleaved at Pulse Repetition Interval (PRI) or burst level, in particular acquisitions carried out by changing antenna beam pointing in azimuth or in elevation at each PRI/burst. By using an increased PRF, it is possible to obtain N Stripmap acquisitions having individually a PRF compatible with the size of the antenna. In this way, the values of azimuth ambiguity are not altered and at the same time the sum of the illumination angles allows to synthesize an equivalent antenna with a greater beam (up to N times) or allows the separation of the swath in range into N swaths of smaller size (approximately 1/N—in particular, smaller width along the across-track direction) without affecting other parameters (e.g. resolution, azimuth ambiguity, etc.). For further details, reference can be made to Ref5, Ref6 and Ref7, which concern the above time sharing technique (that is named DIscrete Stepped Strip—DI2S)

In this respect, FIGS. 4A and 4B schematically illustrate an example of transmission and reception operations according to the DI2S technique. In particular, FIG. 4A shows the transmission by an airborne/spaceborne SAR system 41, equipped with a single, non-partitioned antenna and a single receiver, of narrow beams (i.e., beams that are narrow along the azimuth direction) whose pointing in azimuth is varied at PRI/burst level. Instead, FIG. 4B shows reception by the airborne/spaceborne SAR system 41 that uses said narrow beams and varies their pointing in azimuth at PRI/burst level.

The following Table I summarizes the main features/drawbacks of each technique.

TABLE I

| TECHNIQUE | FEATURES/DRAWBACKS |
|---|---|
| Space Sharing | Very high number of receivers; Synchronization and alignments of the receivers; High power/High density (antenna partitioned). |
| Angular Sharing | High number of receivers; High power (antenna partitioned); Very small swath (significantly increased PRF). |
| Time Sharing | Very small swath (significantly increased PRF). |

OBJECT AND SUMMARY OF THE INVENTION

A general object of the present invention is that of providing a method for performing SAR acquisitions that allows overcoming, at least in part, the above drawbacks of currently known SAR techniques.

Moreover, a specific object of the present invention is that of providing a method for performing SAR acquisitions that allows acquiring wide-swath, high azimuth resolution SAR images, eliminating (or at least reducing) limitations of currently known SAR techniques.

These and other objects are achieved by the present invention in that it relates to a method for performing SAR acquisitions, as defined in the appended claims.

In particular, the present invention concerns a method for performing SAR acquisitions, comprising performing, in a time division fashion, SAR acquisitions of areas of a swath of earth's surface by means of a EAR system carried by an air or space platform.

In detail, performing SAR acquisitions in a time division fashion includes contemporaneously acquiring, in each pulse repetition interval, a plurality of areas of the swath that are separated in azimuth.

Moreover, the areas acquired in T successive pulse repetition intervals form an azimuth-continuous portion of said swath, wherein T is an integer greater than one.

BRIEF DESCRIPTION OF THE DRAWINGS

For a better understanding of the present invention, preferred embodiments, which are intended purely by way of non-limiting examples, will now be described with reference to the attached drawings (all not to scale), wherein.

DETAILED DESCRIPTION OF PREFERRED EMBODIMENTS OF THE INVENTION

Figure 1A:
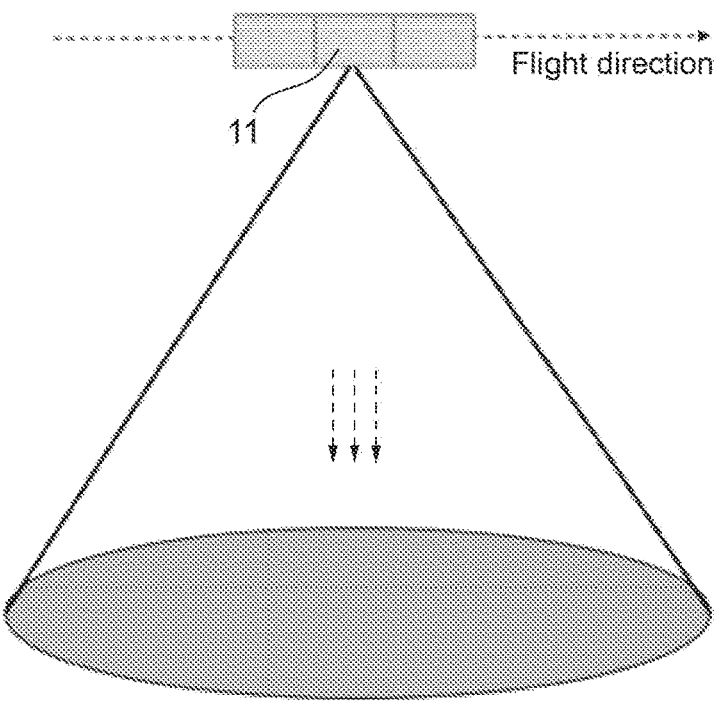
FIGS. 1A and 1B schematically illustrate an example of transmission and reception operations according to the space-sharing SAR technique named Displaced Phase Centers (DPC)
Figure 1B:
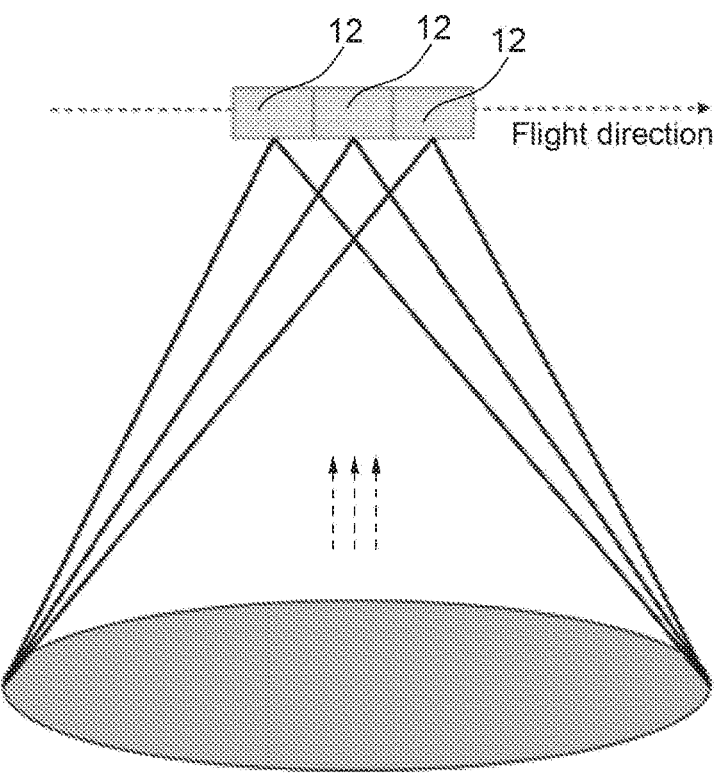
Figure 2A:
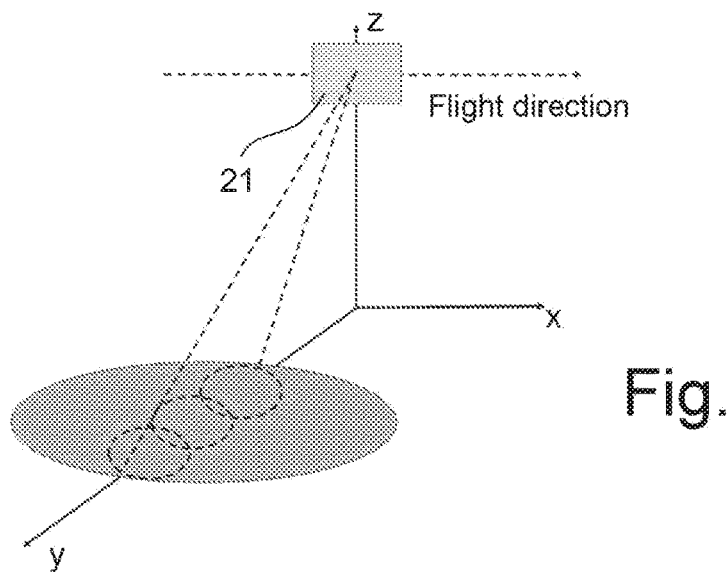
FIGS. 2A, 2B and 2C schematically illustrate an example of transmission and reception operations according to the angular-sharing SSR technique named Multiple Elevation Beam (MEB)
Figure 2B:
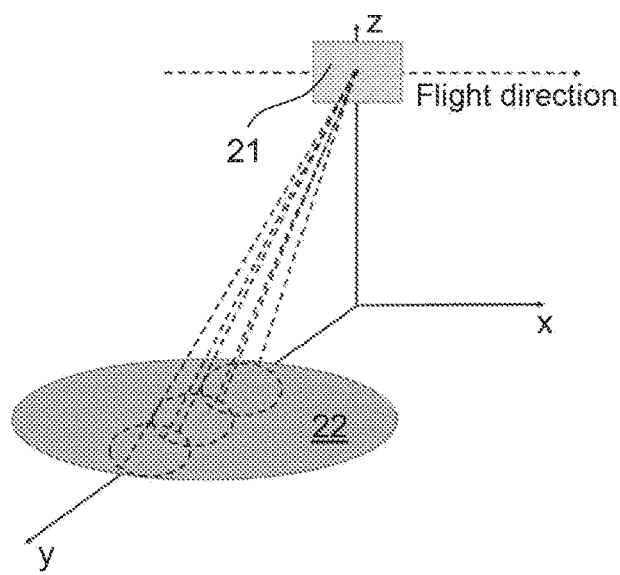
Figure 2C:
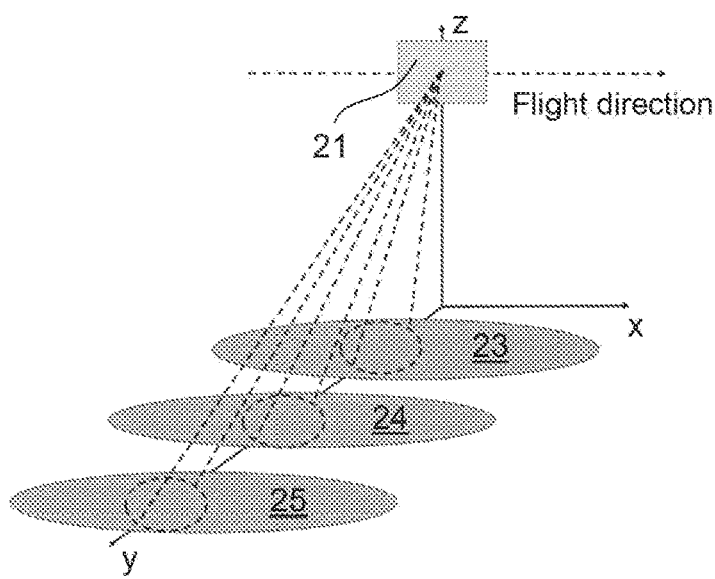
Figure 3A:
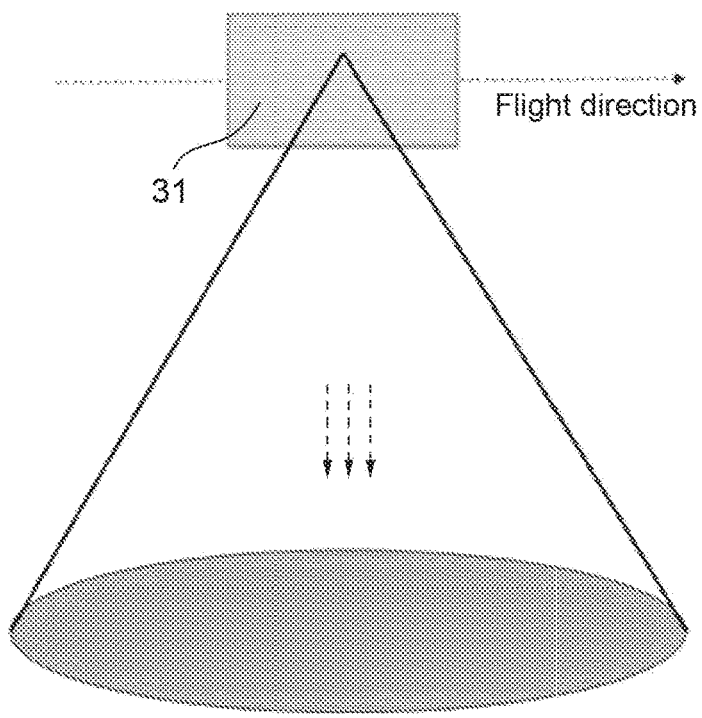
FIGS. 3A and 3B schematically illustrate an example of transmission and reception operations according to the angular-sharing SAR technique named Single Phase Centre MultiBeam (SPCMB)
Figure 3B:
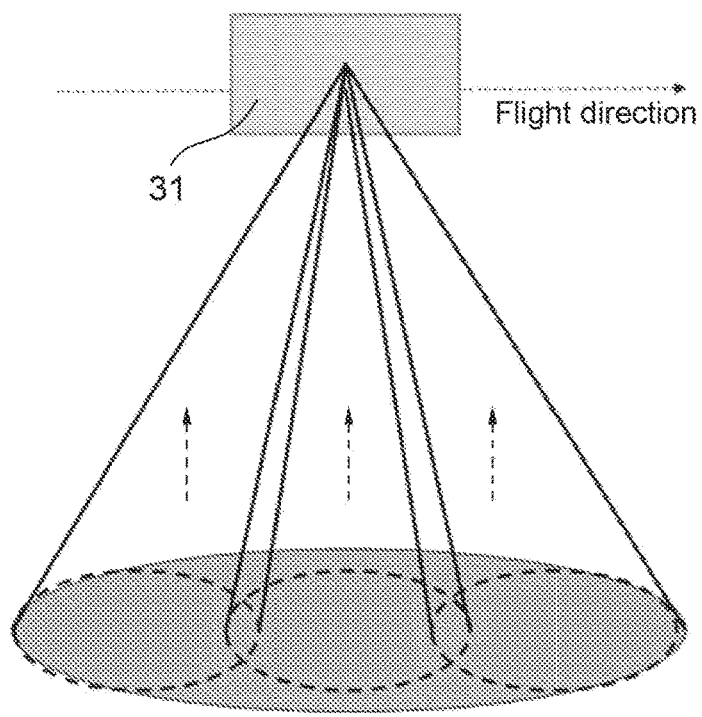
Figure 4A:
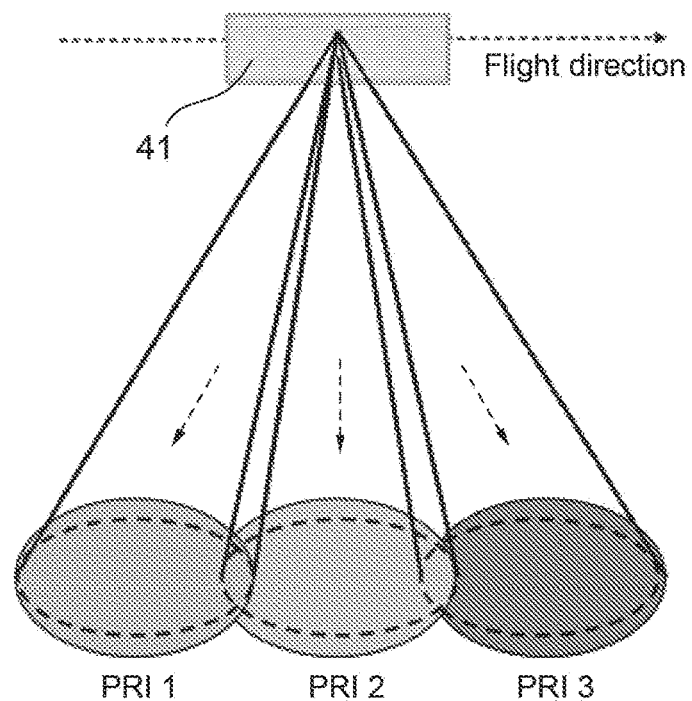
FIGS. 4A and 4B schematically illustrate an example of transmission and reception operations according to the time-sharing SAR technique named Discrete Stepped Strip (DI2S)
Figure 4B:
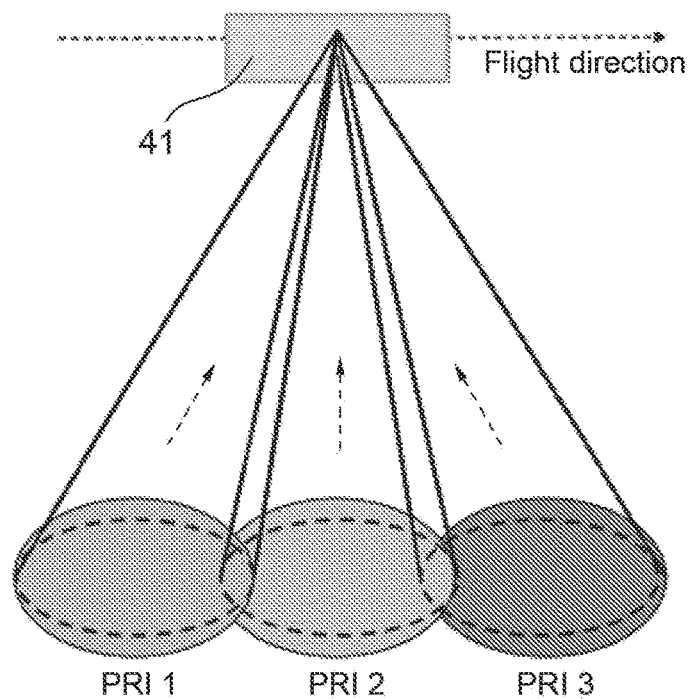

The following description is presented to enable a person skilled in the art to make and use the invention. Various modifications to the embodiments will be readily apparent to those skilled in the art, without departing from the scope of the present invention as claimed. Thence, the present invention is not intended to be limited to the embodiments shown and described, but is to be accorded the widest scope of protection consistent with the principles and features disclosed herein and defined in the appended claims.

The present invention stems from Applicant's idea of merging peculiarities of the time-sharing DI2S technique with those of the angular-sharing SPCMB technique so as to reduce their respective drawbacks and to synergistically combine their respective positive aspects.

In particular, the present invention concerns a method for performing SAR acquisitions that has been named by the Applicant "DIstributed Sparse Sampling for SAR Systems" (DI4S) and that allows generating SAR images with enhanced azimuth resolution, while avoiding swath size reduction.

In detail, the present invention concerns a method that comprises performing, in a time division fashion, SAR acquisitions of areas of a swath of earth's surface by means of a SAR system carried by an air or space platform (e.g., an aircraft/drone/helicopter or a satellite/spacecraft).

More specifically, performing SAR acquisitions in a time division fashion includes contemporaneously acquiring, in each pulse repetition interval (PRI), a plurality of areas of the swath that are separated in azimuth (i.e., along an azimuth direction that is defined by a ground track of a flight direction of the SAR system and that is parallel to said fight direction).

Moreover, the areas acquired in T successive pulse repetition intervals (PRIs) form an azimuth-continuous portion of said swath (i.e., a continuous portion without "holes" along the azimuth direction), wherein T is an integer greater than one (i.e., T>1).

Preferably, contemporaneously acquiring, in each PRI, a plurality of areas of the swath that are separated in azimuth includes:
- transmitting a plurality of radar signals by contemporaneously using different transmission radar beams, and receiving a plurality of backscattered radar signals by contemporaneously using different reception radar beams, wherein
  - the transmission radar beams are angularly separated in azimuth (i.e., along the azimuth direction) so as to be pointed, each, at a respective one of the areas of the swath to be contemporaneously acquired, and
  - the reception radar beams are angularly separated in azimuth (i.e., along the azimuth direction) so as to be pointed, each, at a respective one of the areas of the swath to be contemporaneously acquired; or
- transmitting one or more radar signals by using a single transmission radar beam, and receiving a plurality of backscattered radar signals by contemporaneously using different reception radar beams, wherein
  - the single transmission radar beam is such that to illuminate, with the transmitted radar signal(s), all the areas of the swath to be contemporaneously acquired (i.e., said single transmission radar beam has a size such that to, and is pointed so as to, "cover" all the areas of the swath to be contemporaneously acquired), and
  - the reception radar beams are narrower than said single transmission radar beam and are angularly separated in azimuth (i.e., along the azimuth direction) so as to be pointed, each, at a respective one of the areas of the swath to be contemporaneously acquired;

wherein the transmission and reception radar beams used in T successive PRIs form an azimuth-continuous angular span (i.e., a continuous angular span without angular interruptions/holes along the azimuth direction).

Preferably, contemporaneously acquiring, in each PRI, a plurality of areas of the swath that are separated in azimuth includes contemporaneously acquiring, in each PRI, P areas of the swath that are separated in azimuth, P being an integer greater than one (i.e., P>1).

Conveniently, contemporaneously acquiring, in each PRI, P areas of the swath that are separated in azimuth includes:
- transmitting a plurality of radar signals by contemporaneously using P transmission radar beams, and receiving a plurality of backscattered radar signals by contemporaneously using P reception radar beams, wherein
  - the P transmission radar beams are angularly separated in azimuth so as to be pointed, each, at a respective one of the P areas of the swath to be contemporaneously acquired, and
  - the P reception radar beams are angularly separated in azimuth so as to be pointed, each, at a respective one of the P areas of the swath to be contemporaneously acquired; or
- transmitting one or more radar signals by using a single transmission radar beam, and receiving a plurality of backscattered radar signals by contemporaneously using P reception radar beams, wherein
  - the single transmission radar beam is such that to illuminate, with the transmitted signal(s), all the P areas of the swath to be contemporaneously acquired, and
  - the P reception radar beams are angularly separated in azimuth, are narrower than said single transmission radar beam, and are pointed, each, at a respective one of the P areas of the swath to be contemporaneously acquired;

wherein the transmission and reception radar beams used in T successive PRIs form an azimuth-continuous angular span. Conveniently, contemporaneously acquiring, in each PRI, P areas of the swath that are separated in azimuth includes using, in transmission and/or reception, an antenna of the SAR system partitioned into P different zones.

More conveniently, contemporaneously acquiring, in each PRI, P areas of the swath that are separated in azimuth includes using, in transmission and/or reception, an antenna of the SAR system partitioned in elevation into P different zones (i.e., along a nadir direction that passes through the phase center of the antenna of the SAR system and that is orthogonal to the earth's surface and to the flight direction and, hence, also to the azimuth direction).

Conveniently, the SAR acquisitions are performed by using one and the same elevation pointing (i.e., with respect to the nadir direction) corresponding to the swath to be observed.

Conveniently, the P×T areas acquired in T successive PRIs are individually processed, then correlated and, finally, information merging is carried out, so as to reduce/compensate for space errors, such as those related to channel synchronization and Doppler parameter estimation.

In view of the foregoing, the present invention uses a SAR with the capability to acquire P channels at the same time (e.g., by means of a phased array with elevation partition capabilities or a multi-feed reflector antenna) along with an increased PRF (in particular, increased by T times with respect to the nominal PRF associated with the used SAR) to acquire strips of the earth's surface with performance improved by P×T times.

Figure 5B:
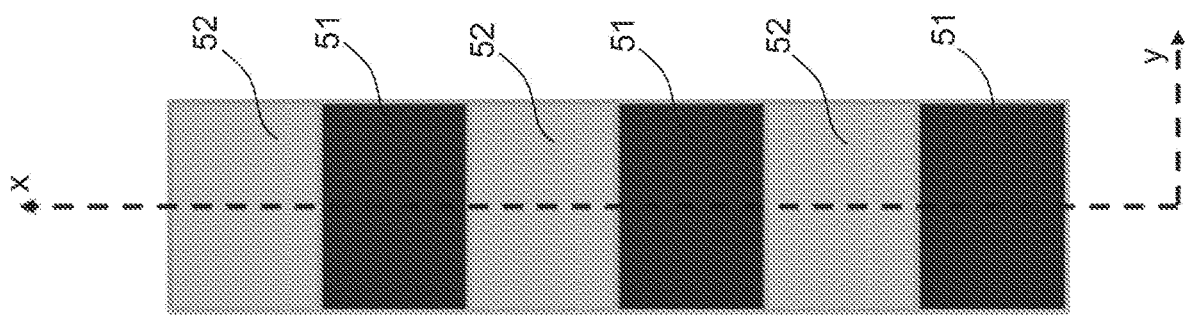
FIGS. 5A and 5B schematically illustrate a non-limiting example of implementation of a method for performing SAR acquisitions according to a preferred embodiment of the present invention.
Figure 5A:
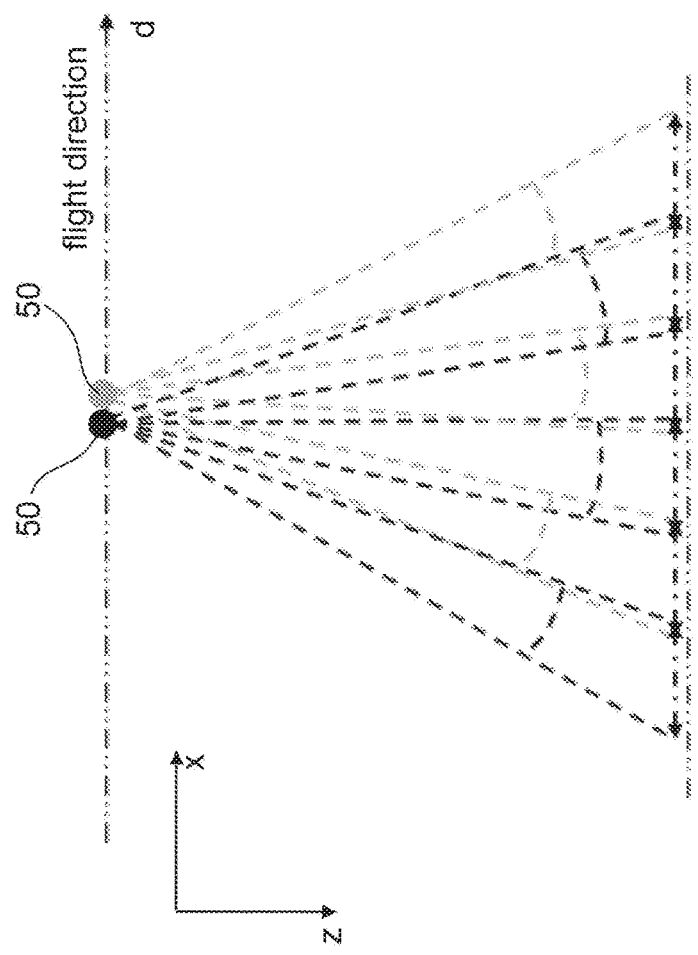

For a better understanding of the present invention, FIGS. 5A and 5B schematically illustrate a non-limiting example of implementation of a method according to a preferred embodiment of the present invention, wherein T=2 and P=3.

In particular, FIG. 5A shows a SAR system 50 that is associated with a given nominal pulse repetition frequency $PRF_{nom}$ and is carried in flight/orbit along a flight direction d by an air/space platform (not shown in FIGS. 5A and 5B), such as an aircraft, a drone, a helicopter, a satellite or a spacecraft.

More specifically, FIG. 5A shows acquisition geometry in a plane xz, where x denotes an azimuth direction parallel to the flight direction d and z denotes a nadir direction perpendicular to the azimuth direction x, the flight direction d and the earth's surface. Instead, FIG. 5B shows the acquisition geometry in a plane xy, where y denotes an across-track direction that lies on the earth's surface and is perpendicular to both the azimuth direction x and the nadir direction z.

The SAR system 50 is used with an operational pulse repetition frequency $PRF_{op}=2PRF_{nom}$, whereby $PRI_{op}=1/PRF_{op}=1/(2PRF_{nom})=PRI_{nom}/2$, where $PRI_{nom}$ denotes the nominal pulse repetition interval and $PRI_{op}$ denotes the operational pulse repetition interval.

As shown in FIGS. 5A and 5B:
- at a first time instant, the SAR system 50 contemporaneously acquires three first areas 51 separated in azimuth (i.e., along the azimuth direction x) by using radar beams that have different squint angles with respect to the flight direction d, are angularly separated in azimuth (i.e., along the azimuth direction x) and are pointed, each, at a respective one of the three first areas 51, and
- at a second time instant, the SAR system 50 contemporaneously acquires three second areas 52 (that are different from the first areas 51 and are separated in azimuth (i.e., along the azimuth direction x)), by using radar beams that have different squint angles with respect to the flight direction d, are angularly separated in azimuth (i.e., along the azimuth direction x) and are pointed, each, at a respective one of the three second areas 52;

wherein:
- the acquired first and second areas 51 and 52 form an azimuth-continuous strip (i.e., a continuous strip without "holes" along the azimuth direction x), and
- the radar beams form an azimuth-continuous angular span (i.e., a continuous angular span without angular interruptions along the azimuth direction x).

Therefore, after $2PRI_{op}$ (more in general, after $T\ PRI_{op}$), a continuous overall angular span is achieved that is six (i.e., P×T) times greater than the nominal ones, thus improving azimuth resolution by a factor equal to P×T.

By increasing the PRF of F times with respect to the classical Stripmap, each of the P×T areas is acquired with the nominal PRF. Conveniently, in the same PRI, the acquisitions are separated at least of an antenna aperture (in case T=2). These features allow obtaining a correct azimuth sampling and, consequently, a good performance as for azimuth ambiguity.

Figure 6:
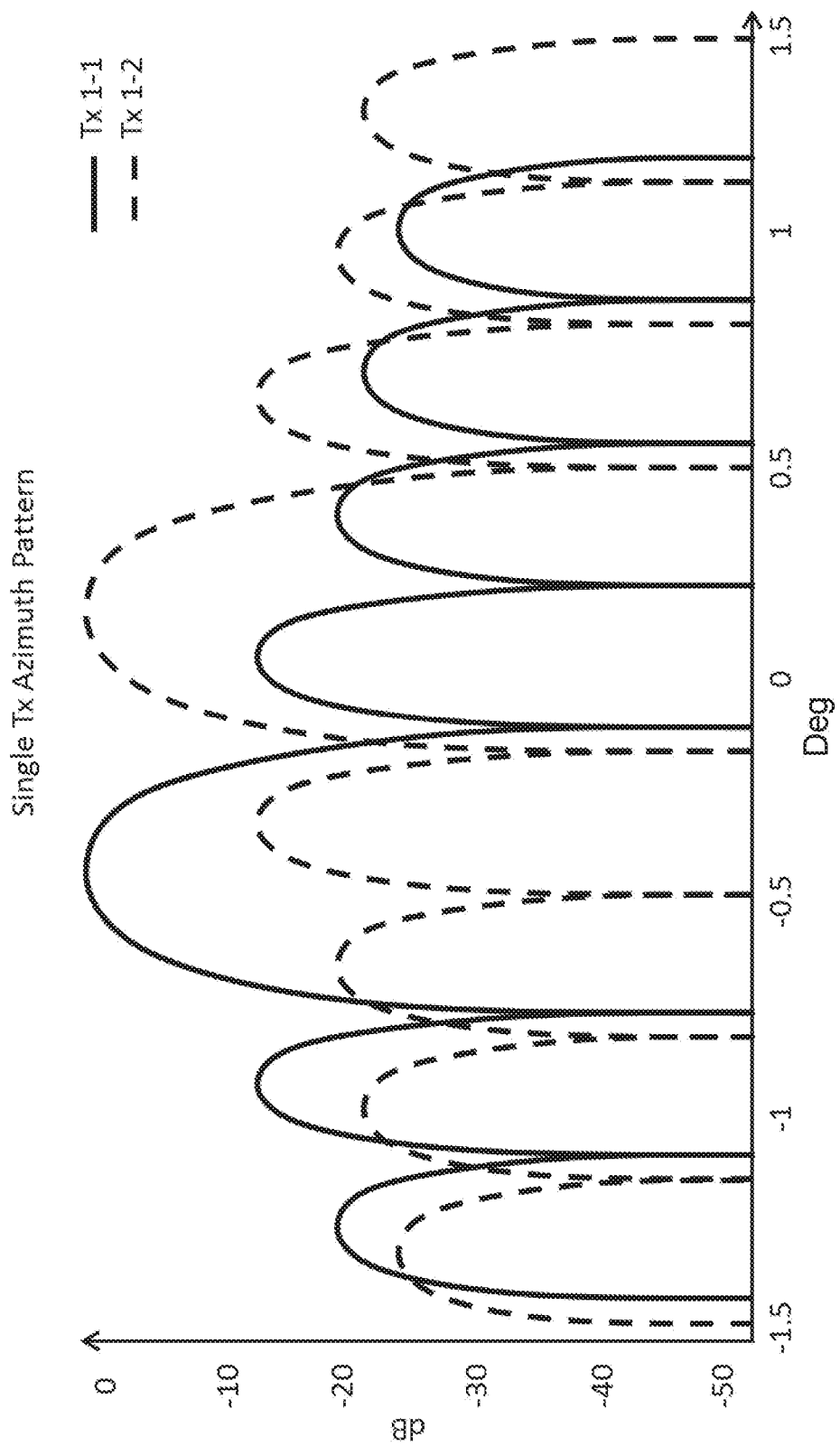
FIGS. 6-8 show examples of features/performance of the present invention.
Figure 7:
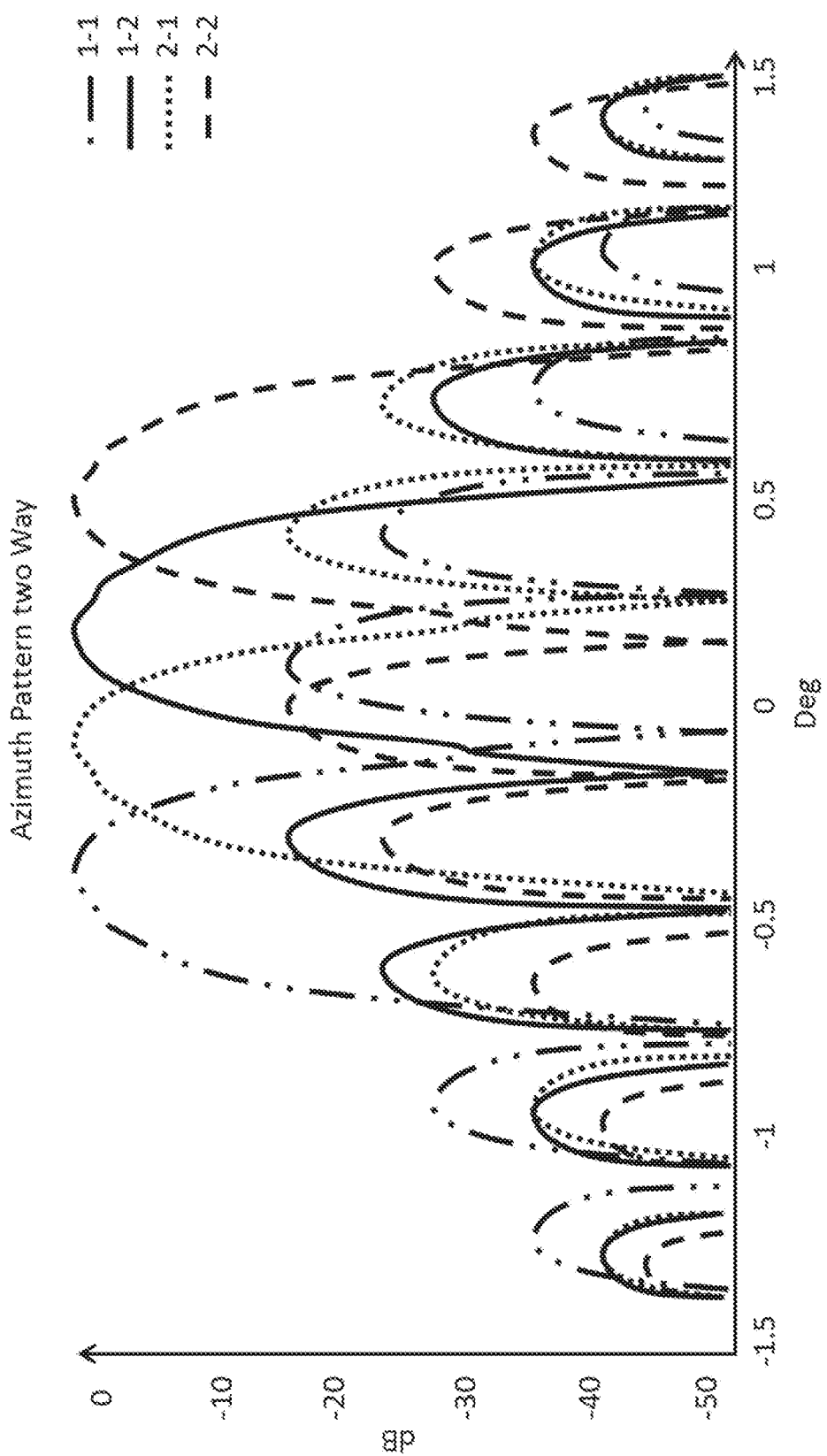
Figure 8:
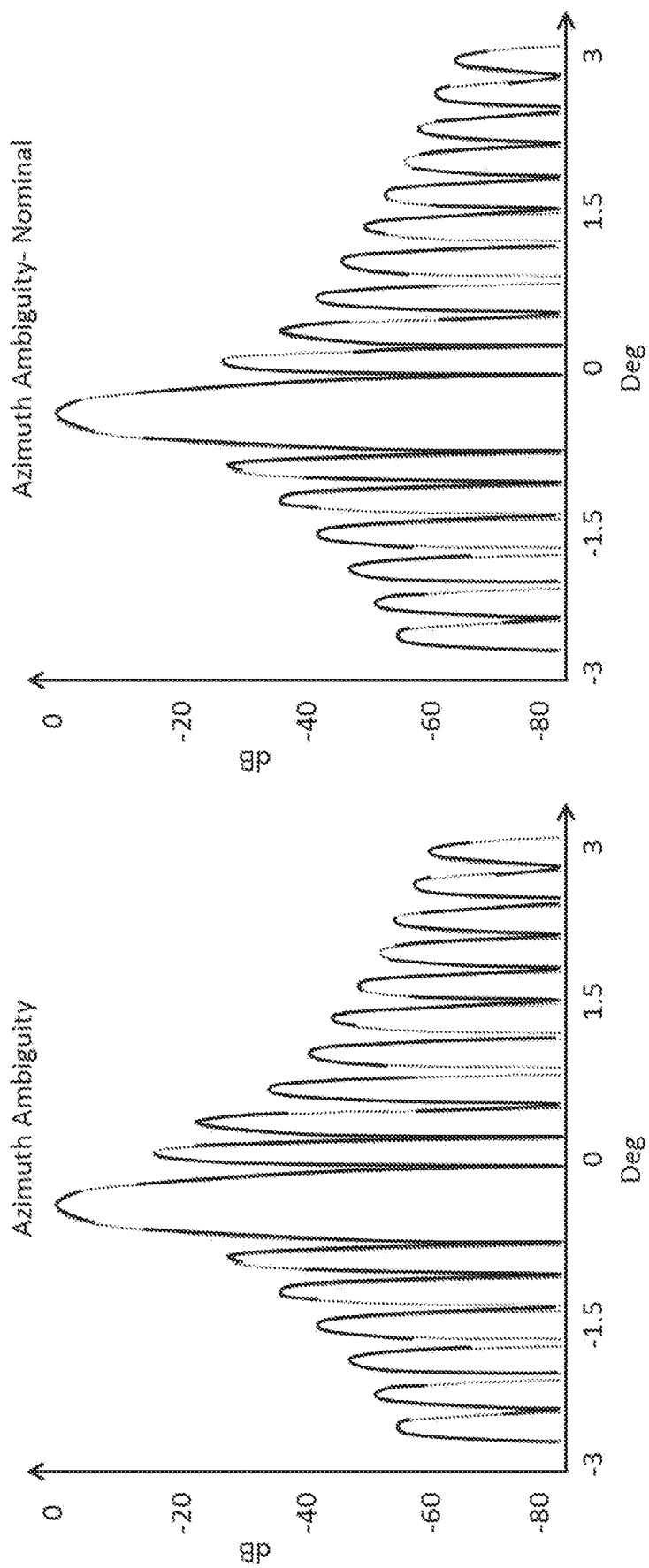

FIG. 6 shows an example of transmission pattern illuminating two different non-contiguous zones, wherein T=P=2. Instead, FIG. 7 shows the two-ways azimuth pattern of each of the four channels. The two-ways azimuth pattern is minimally altered with respect to the nominal case, as shown in FIG. 8.

It is important to highlight the fact that the present invention does not require antenna partition in azimuth, whereby the impact on NESZ (i.e., Noise Equivalent Sigma Zero) is manageable (e.g., if an antenna partition in elevation is used, it can be compensated by using a higher antenna—the same approach cannot be used in the space sharing techniques that need a reduced azimuth antenna in each channel).

As previously explained, the present invention involves contemporaneous acquisition, within one and the same PRI, of P different and separate zones. This can be accomplished by means of different solutions based, for example, on multi-feed reflector antennas, active arrays or hybrid solutions (e.g., a reflector antenna fitted with an active array acting as feed thereof).

Hereinafter the case of an active array will be analyzed, remaining it clear that the same logic or equivalent ones may be applied, mutatis mutandis, also to other antenna typologies.

In particular, in the following, examples of different logic approaches usable with an active array will be described, wherein P is assumed, for simplicity, to be equal to two (i.e., P=2).

Figure 9:
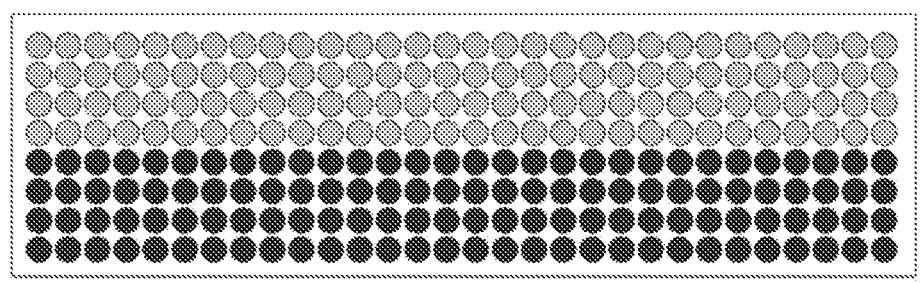
FIGS. 9 and 10 show possible solutions for antennas used in reception according to preferred, non-limiting embodiments of the present invention.
Figure 10:
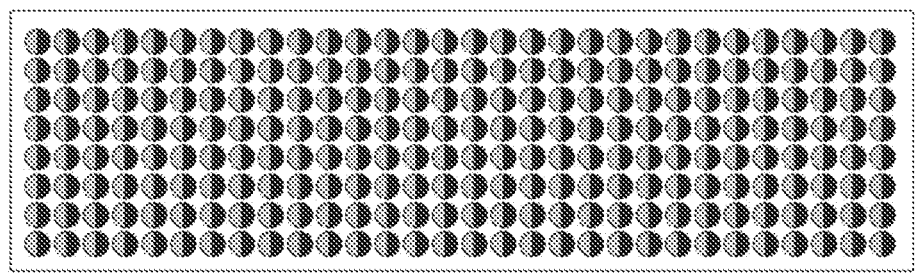

More specifically, when an active array is used in reception, two main logics may be conveniently exploited:
1) a partition in elevation of the antenna—namely, as shown in FIG. 9, the used antenna (in FIG. 9 denoted as a whole by 61) may be conveniently partitioned into two halves (more in general, into P portions) in elevation (i.e., along the nadir direction) and each half may be conveniently exploited to receive backscattered signal(s) from a different area; since, differently from the known SAR techniques, it is not necessary to acquire a single wide zone, it is possible to increase height of the antenna 61 so that each of the two halves is sized coherently with the area to be acquired; in this respect, it is worth noting that the space division techniques require acquisition of a wide swath in azimuth and, hence, require that the antenna be partitioned in azimuth so that the single sub-antennas have a predefined size depending on the desired resolution (namely, reduced by a factor that is at least equal to the desired resolution enhancement factor); therefore, differently from the present invention that allows to compensate the partition in elevation by a higher antenna, the space division techniques cannot use a longer antenna to recover directivity loss; in some cases, in order for the directivity loss to be recovered, the use of higher antennas has been proposed in the past but, since it is necessary to acquire the whole area, it is required that a further complication of dynamic beam re-pointing in elevation be introduced (so-called "SCan On Receive");
2) an exploitation of the whole antenna (as shown in FIG. 10, where the antenna is denoted as a whole by 62) by digitally or analogically dividing the signal received by the single antenna elements into two parts (more in general, into P parts) and, then, by applying amplitude and phase modulations to each signal part to obtain the desired beams and, hence, to acquire the desired zones.

The first solution has an easier application but suffers a directivity loss of approximately a P factor (unless the height of the antenna is increased thereby completely preventing such a loss). On the contrary, the second solution does not affect the directivity.

Figure 11:
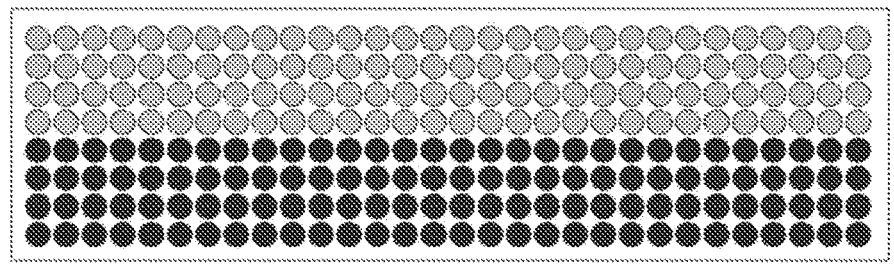
FIGS. 11-13 show possible solutions for antennas used in transmission according to preferred, non-limiting embodiments of the present invention.
Figure 12:
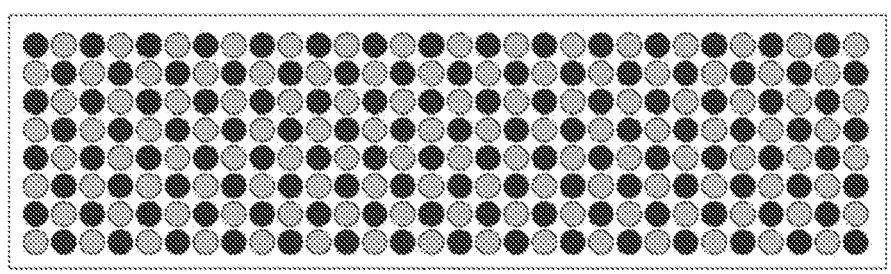
Figure 13:
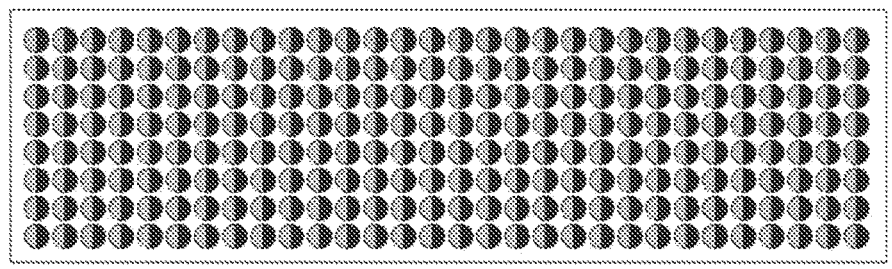

Instead, in transmission, it is possible to use multiple solutions:
1) similarly to the first solution in reception, the used antenna may be conveniently partitioned into two halves (more in general, into P portions) in elevation; as shown in FIG. 11 (where the antenna is denoted as a whole by 71), each of the two halves will illuminate the desired zone; also in this case, in order to recover directivity, it is possible to increase the height of the antenna 71 without introducing other necessities;
2) as shown in FIG. 12, the antenna (denoted as a whole by 72) may be conveniently partitioned in homogeneous or chaotic blocks, whereby it is possible to modulate the single blocks in order to illuminate the desired areas; the impact on the directivity will depend on distribution of the single blocks and, hence, on the equivalent sampling of the single parts in which the antenna 72 is divided;

3) as shown in FIG. 13, the antenna (denoted as a whole by 73) may be conveniently partitioned in homogeneous blocks, complying with sampling requirements, whereby it is possible to modulate the single blocks in order to illuminate the desired areas; in this case there is no directivity alteration.

The following Table II summarizes the main differences between the present invention and the known SAR techniques.

TABLE II

| TECHNIQUE | DIFFERENCES WITH RESPECT TO THE PRESENT INVENTION |
|---|---|
| Space Sharing | To increase of a k factor the azimuth resolution, the space sharing technique requires k receivers. Instead, the present invention requires a lower number (e.g., P receivers with a T-time increased PRF with P × T = k). The space sharing technique requires that the antenna be divided in azimuth into k sub-antennas. Instead, the present invention do not require antenna partition in azimuth. The space sharing technique foresees the simultaneous (i.e. at the same time, inside the same PRI) acquisition (transmission and reception) of a single/contiguous zone from different azimuth positions. Instead, the present invention foresees the simultaneous (i.e. at the same time, inside the same PRI) acquisition (transmission and reception) of separated zones. |
| Angular Sharing (SPCMB) | To increase of a k factor the azimuth resolution, the angular sharing technique requires k receivers. Instead, the present invention requires a lower-number (e.g., P receivers with a T-time increased PRF with P × T = k). The angular sharing technique requires the transmission of a large beam in azimuth and the simultaneous reception of different azimuth-continuous zones. Instead, the present invention involves simultaneously acquiring areas separated in azimuth. |
| Time Sharing | To increase of a k factor the azimuth resolution, the time sharing technique requires an increase in the PRF of k times. Instead, the present invention requires a lower number (e.g., P receivers with a T-time increased PRF with P × T = k). |

In view of the foregoing, the technical advantages and the innovative features of the present invention are immediately clear to those skilled in the art.

In conclusion, it is clear that numerous modifications and variants can be made to the present invention, all falling within the scope of the invention, as defined in the appended claims.

The invention claimed is:

1. A method for performing SAR acquisitions, comprising performing, in a time division fashion, SAR acquisitions of areas of a swath of earth's surface by means of a synthetic aperture radar system carried by an air or space platform;
   characterized in that performing SAR acquisitions in a time division fashion includes contemporaneously acquiring, in each pulse repetition interval, a plurality of areas of the swath that are separated in azimuth, by:
   (i) transmitting a plurality of radar signals by contemporaneously using different transmission radar beams, and receiving a plurality of backscattered radar signals by contemporaneously using different reception radar beams, wherein
      (a) the transmission radar beams are angularly separated in azimuth so as to be pointed, each, at a respective one of the areas of the swath to be contemporaneously acquired, and
      (b) the reception radar beams are angularly separated in azimuth so as to be pointed, each, at a respective one of the areas of the swath to be contemporaneously acquired;
   wherein the transmission and reception radar beams used in T successive pulse repetition intervals form an azimuth-continuous angular span, whereby the areas acquired in T successive pulse repetition intervals form an azimuth-continuous portion of the swath, T being an integer greater than one.

2. The method of claim 1, wherein contemporaneously acquiring, in each pulse repetition interval, a plurality of areas of the swath that are separated in azimuth includes contemporaneously acquiring, in each pulse repetition interval, P areas of the swath that are separated in azimuth, by:
   transmitting a plurality of radar signals by contemporaneously using P transmission radar beams, and receiving a plurality of backscattered radar signals by contemporaneously using P reception radar beams, wherein
      (a) the P transmission radar beams are angularly separated in azimuth so as to be pointed, each, at a respective one of the P areas of the swath to be contemporaneously acquired, and
      (b) the P reception radar beams are angularly separated in azimuth so as to be pointed, each, at a respective one of the P areas of the swath to be contemporaneously acquired;
   wherein P is an integer greater than one, and wherein the P areas of the swath separated in azimuth are acquired by using, in transmission and/or reception, an antenna of the synthetic aperture radar system partitioned into P different zones.

3. The method of claim 2, wherein the P areas of the swath separated in azimuth are acquired by using, in transmission and/or reception, the antenna of the synthetic aperture radar system partitioned into P different zones in elevation.

4. The method according to claim 1, wherein the SAR acquisitions are performed by using one and the same elevation pointing corresponding to the swath to be observed.

5. A synthetic aperture radar system installed on board an air or space platform and configured to carry out the method for performing SAR acquisitions as claimed in claim 1.

6. A space platform equipped with a synthetic aperture radar system configured to carry out the method for performing SAR acquisitions as claimed in claim 1.

7. The space platform of claim 6, wherein said space platform is a spacecraft or a satellite.

8. An air platform equipped with a synthetic aperture radar system configured to carry out the method for performing SAR acquisitions as claimed in claim 1.

9. The air platform of claim 8, wherein said air platform is an aircraft, a drone or a helicopter.

10. A method for performing SAR acquisitions, comprising performing, in a time division fashion, SAR acquisitions of areas of a swath of earth's surface by means of a synthetic aperture radar system carried by an air or space platform;

characterized in that performing SAR acquisitions in a time division fashion includes contemporaneously acquiring, in each pulse repetition interval, a plurality of areas of the swath that are separated in azimuth, by:

(i) transmitting one or more radar signals by using a single transmission radar beam, and receiving a plurality of backscattered radar signals by contemporaneously using different reception radar beams, wherein
 (a) the single transmission radar beam is such that to illuminate, with the transmitted radar signal(s), all the areas of the swath to be contemporaneously acquired, and
 (b) the reception radar beams are narrower than said single transmission radar beam and are angularly separated in azimuth so as to be pointed, each, at a respective one of the areas of the swath to be contemporaneously acquired;

wherein the transmission and reception radar beams used in T successive pulse repetition intervals form an azimuth-continuous angular span, whereby the areas acquired in T successive pulse repetition intervals form an azimuth-continuous portion of the swath, T being an integer greater than one.

* * * * *